United States Patent [19]

Blucher et al.

[11] 3,995,699
[45] Dec. 7, 1976

[54] REPLACEABLE INSERT FOR AGRICULTURAL DISC

[75] Inventors: Joseph T. Blucher, Waltham; Ernest A. Evancic, Fitchburg, both of Mass.

[73] Assignee: Wallace-Murray Corporation, Fitchburg, Mass.

[22] Filed: Dec. 11, 1975

[21] Appl. No.: 639,601

[52] U.S. Cl. .............................. 172/719; 172/604; 172/769; 172/555; 172/548; 172/556; 172/713; 172/747; 172/770

[51] Int. Cl.² .................. A01B 15/16; A01B 23/02

[58] Field of Search .......... 172/604, 719, 555, 769, 172/548, 556, 713, 747, 770, 772, 535, 753

[56] References Cited
UNITED STATES PATENTS

| 126,655 | 5/1872 | Tuttle | 172/604 |
|---|---|---|---|
| 1,205,416 | 11/1916 | Trout | 172/719 |
| 1,718,541 | 6/1929 | Dirschauer | 172/555 |
| 2,705,448 | 4/1955 | Ingersoll | 172/555 |

*Primary Examiner*—George J. Marlo

[57] ABSTRACT

A replaceable tool for attachment to the periphery of an agricultural disc is formed of an inverted U-shaped investment casting which can be fitted over the marginal edge portion of the disc to present parallel leading and trailing faces connecting side surfaces which converge outwardly of the disc, being inclined at different angles relative to the plane of the disc so as to present on one side of said disc a side surface providing clearance for the disc on that side of the disc and the other side surface being at a greater angle which reduces the areas of the end faces of the tool to reduce resistance to passage of the tool through the ground.

5 Claims, 4 Drawing Figures

REPLACEABLE INSERT FOR AGRICULTURAL DISC

This invention relates to agricultural implements and more particularly to a furrow-making tool which is adapted to be attached, with a multiplicity of such tools, along the periphery of a disc so as to form a furrow-making implement for seed and the like.

One of the annoying characteristics of present day implements used for this purpose is their short life due to the abrasive action to which they are subjected in normal use. Usually they are made of a solid one-piece steel plate with bent out (set) teeth. This necessitates replacement of the whole article when the teeth are worn beyond further effectiveness in use.

It is the main object of the invention to provide replaceable attachments or "inserts" that in and of themselves have better wear characteristics and can be individually replaced as needed without discarding the main disc or other inserts which are still serviceable.

It is a further object of the invention to provide an insert which may be attached to a planar disc with either end of the tool acting as a leading face so that the tools may be attached to the disc in succession around the periphery of the disc with the tools alternately extending outwardly further on first one side of the disc and then on the other side of the disc in the manner of set teeth.

These and other objects of the invention are accomplished by making the insert of an alloy casting and providing it with an inverted U-shape so that it may be removably fitted over the marginal edge portion of the disc and riveted through its U-legs to the disc.

The invention may be better understood by reference to the accompanying drawing wherein FIG. 1 is a front elevational view of an "insert" in accordance with the invention;

Each insert has a U-shape formed by two legs 20 and 21 and a connecting portion 24 which lies between two angularly-related side surfaces 26, 28 converging outwardly and connected by the top face 30. The inclination of both side surfaces is towards the same side of the disc.

Figure 4:
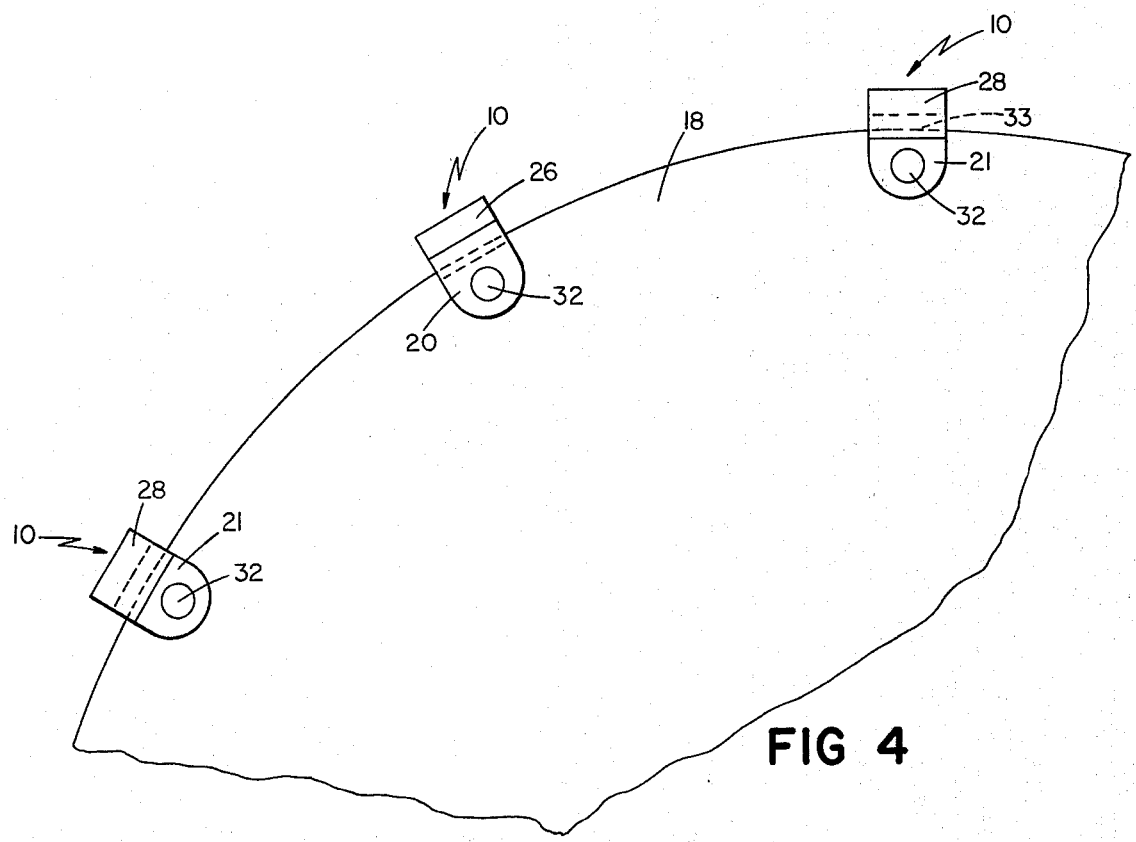
FIG. 4 is a view broken away of a disc on which are shown three of the inserts mounted with the middle insert being mounted facing in the opposite sidewise direction from the mounting of the two flanking inserts 10.

Preferably, the end faces of each insert are parallel and symmetrical in mirror image so that the inserts can be mounted alternately facing first in one sidewise direction and then in the opposite sidewise direction as shown in FIG. 4 without requiring separate right- and left-hand designs.

Each insert is fixed to the disc by a rivet 32. In order to properly seat the inserts on the marginal edge portion of the disc 18 the groove formed by the two legs 20 and 21 of the U-shaped insert is arcuate along a radius conforming to the radius of the disc and forms a conforming bottom wall 33 for seating the insert against the peripheral edge of the disc. When an insert needs to be replaced, its rivet 32 is knocked out and a new insert is riveted in its place.

The inserts used in accordance with the drawing are made from investment castings of wear resistant alloys that do not lend themselves to machining when in the wrought form, such as, e.g., Hadfield alloy (1.5 C, 14–16 Mn). Thus the end faces 34 of the insert are relieved on one side at an angle of 7° in order to provide clearance on that side of the disc while the opposite side surface 26 of the insert is, in the form shown, at an angle of 45° to the plane of the disc thus reducing the area of the leading end face to reduce resistance to passage of the insert through the ground.

Figure 1:
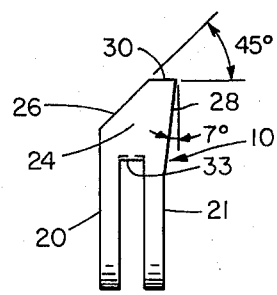
Figure 2:
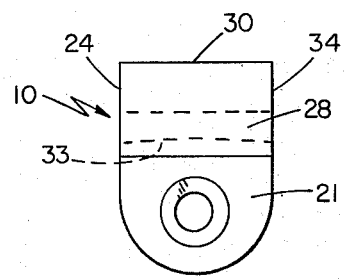
FIG. 2 is a side elevation thereof.
Figure 3:
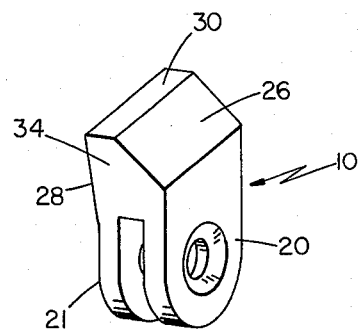
FIG. 3 is a perspective view of the insert rotated clockwise approximately 225° from its position as shown in FIG. 1.

The 7° inclination shown in the drawings of surface 28 can be in a range of from 1° to 15°, and, whereas the 45° inclination of the other side surface 26 is preferred, that angle may vary from 35° to 70°. It is to be noted that in the form shown in the drawings the 7° surface 28 extends inwardly of the disc below the bottom wall 33 (FIG. 1) of the groove between the two legs 20 and 21 as required for strength, but this adds unnecessary width to the tool on the other side above the groove wall 33. This makes the width of the tool unnecessarily large unless the corner portion is removed as along the 45° angle shown in the drawing.

Twelve of the inserts can be replaceably riveted to a 11 ½ inch diameter disc but the number can be varied depending upon the radius of the disc.

What is claimed is:

1. A replaceable insert for a ground treating disc comprising an inverted U-shaped metal investment casting which when fitted over the curved edge of a planar disc has plane side surfaces converging radially outwardly of said disc, one side surface being inclined at a predetermined angle to the plane of the disc towards one side of the disc and the other side surface being inclined in the same direction but at a different angle relative to the plane of the disc, the inclinations of said side surfaces providing clearance for the insert on one side of said disc and reducing the areas of the end faces of the insert on the other side of said disc to reduce resistance to passage of said insert through the ground, thereby furnishing a furrow-making tool for said disc.

2. A replaceable insert as claimed in claim 1 wherein the insert has leading and trailing faces which are symmetrical in mirror image.

3. A replaceable insert as claimed in claim 1 wherein the insert has parallel leading and trailing faces.

4. A replaceable insert as claimed in claim 1 wherein the predetermined angle is 7° and the different angle is 45°.

5. A replaceable insert as claimed in claim 1 wherein the predetermined angle is between 1° and 15° and the different angle is from 35° to 70°.

* * * * *